United States Patent
Buehman

(10) Patent No.: US 8,275,500 B2
(45) Date of Patent: Sep. 25, 2012

(54) GAS TURBINE ENGINE FIXED COLLECTIVE TAKEOFF COMPENSATION CONTROL SYSTEM AND METHOD

(75) Inventor: Guerry Buehman, Chandler, AZ (US)

(73) Assignee: Honeywell International Inc., Morristown, NJ (US)

(*) Notice: Subject to any disclaimer, the term of this patent is extended or adjusted under 35 U.S.C. 154(b) by 1233 days.

(21) Appl. No.: 12/046,245

(22) Filed: Mar. 11, 2008

(65) Prior Publication Data

US 2009/0234554 A1 Sep. 17, 2009

(51) Int. Cl.
*G05D 1/00* (2006.01)

(52) U.S. Cl. ....... 701/15; 701/3; 701/4; 701/5; 701/100; 244/17.11; 244/17.13; 244/181; 434/33

(58) Field of Classification Search .......... 701/3, 4, 701/5, 15, 100; 244/17.11, 17.13, 17.19, 244/181; 416/98; 434/33
See application file for complete search history.

(56) References Cited

U.S. PATENT DOCUMENTS

| | | | |
|---|---|---|---|
| 4,071,811 A * | 1/1978 | Irwin | 318/16 |
| 4,423,593 A * | 1/1984 | Zagranski et al. | 60/791 |
| 4,466,526 A | 8/1984 | Howlett | |
| 4,470,257 A | 9/1984 | Wescott | |
| 4,493,465 A * | 1/1985 | Howlett et al. | 244/17.13 |
| 4,947,334 A | 8/1990 | Massey et al. | |
| 4,998,202 A | 3/1991 | Walsh et al. | |
| 5,107,674 A * | 4/1992 | Wibbelsman et al. | 60/778 |
| 5,189,620 A * | 2/1993 | Parsons et al. | 701/100 |
| 5,265,826 A | 11/1993 | Ebert et al. | |
| 5,428,543 A * | 6/1995 | Gold et al. | 701/5 |
| 5,853,152 A * | 12/1998 | Evans et al. | 244/221 |
| 5,873,546 A * | 2/1999 | Evans et al. | 244/17.13 |
| 6,133,643 A | 10/2000 | Lukich et al. | |
| 6,216,064 B1 * | 4/2001 | Johnson et al. | 701/4 |
| 6,698,181 B2 * | 3/2004 | Certain | 60/39.461 |
| 6,748,744 B2 | 6/2004 | Peplow et al. | |
| 6,789,390 B2 | 9/2004 | Hu et al. | |
| 6,873,887 B2 | 3/2005 | Zagranski et al. | |
| 6,986,641 B1 * | 1/2006 | Desai et al. | 416/44 |
| 7,136,738 B2 * | 11/2006 | Zagranski et al. | 701/100 |
| 7,756,612 B2 * | 7/2010 | Salesse-Lavergne | 701/4 |
| 7,873,445 B2 * | 1/2011 | Schaeffer | 701/4 |

OTHER PUBLICATIONS

TC 1-214, Aircrew Training Manual Attach Helicopter, AH-64, Department of the Army, 1994.*
TM 1-1520-238-10, Operator's Manual for Helicopter, Attack, AH-64A Apache, Department of the Army, 1994.*

* cited by examiner

*Primary Examiner* — Thomas G. Black
*Assistant Examiner* — Peter D Nolan
(74) *Attorney, Agent, or Firm* — Ingrassia Fisher & Lorenz, P.C.

(57) ABSTRACT

A system and method of controlling a gas turbine engine controller in a rotorwing aircraft includes determining when a fixed collective takeoff (FCTO) of the rotorwing aircraft is being conducted. A control loop gain of the gas turbine engine controller is at least selectively varied when the FCTO is being conducted.

19 Claims, 3 Drawing Sheets

GAS TURBINE ENGINE FIXED COLLECTIVE TAKEOFF COMPENSATION CONTROL SYSTEM AND METHOD

TECHNICAL FIELD

The present invention generally relates to rotorwing aircraft, such as helicopters and, more particularly, to gas turbine engine control during a fixed collective takeoff of a rotorwing aircraft.

BACKGROUND

For certification purposes, some governmental regulatory agencies have mandated that rotorwing aircraft be able to takeoff without extraordinary pilot skills. This has been interpreted to mean that the aircraft should be designed to implement what is known as a fixed collective takeoff (FCTO). A FCTO is a takeoff from a steady hover, at an altitude below the height-velocity diagram for the aircraft, and without any collective variation. This takeoff is typically accomplished by a slight forward cyclic, to establish a forward velocity with minimal altitude loss. At some forward velocity, translational lift occurs permitting takeoff. It is noted that during the time between the cyclic movement and the altitude increase caused by the translational lift, the aircraft may not contact the ground.

In many instances, the maximum load of a rotorwing aircraft is limited by the ability to accomplish a FCTO. Moreover, the ability to successfully complete a FCTO can be exacerbated by the gas turbine engine control for the aircraft. This is because when the translation lift occurs during the FCTO, the rotor load decreases, resulting in an increase in rotor speed. The gas turbine engine control, in response to the increased rotor speed, reduces the fuel flow to the engine, thus reducing the engine speed and horsepower. The decrease in engine horsepower in turn results in a loss of aircraft altitude.

Hence, there is a need for a system and method for a FCTO to be accomplished in a rotorwing aircraft that does not adversely impact the maximum load of the aircraft and/or does not result in an undesirable reduction in engine horsepower during a FCTO. The present invention addresses at least these needs.

BRIEF SUMMARY

In one embodiment, and by way of example only, a method of controlling a gas turbine engine controller in a rotorwing aircraft includes determining when a fixed collective takeoff (FCTO) of the rotorwing aircraft is being conducted. A control loop gain of the gas turbine engine controller is at least selectively varied when the FCTO is being conducted.

In another exemplary embodiment, a gas turbine engine control system for a rotorwing aircraft includes fixed collective takeoff (FCTO) determination logic and gain multiplier logic. The FCTO logic is operable to determine when a FCTO is being conducted and, when a FCTO is being conducted, to supply a FCTO enable signal. The gain multiplier logic is coupled to receive the FCTO enable signal and is operable, upon receipt thereof, to supply variable control loop gain multipliers.

Furthermore, other desirable features and characteristics of the gas turbine engine control system and method will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the present invention is depicted and described in the context of a single main rotor helicopter, the present invention is not limited to this type of rotorwing aircraft. Indeed, the invention could be implemented in various other rotorwing aircraft including, but not limited to, NOTAR (no tail rotor) aircraft, tip jet rotor aircraft, multi-rotor, and contra-rotating aircraft.

Figure 1:
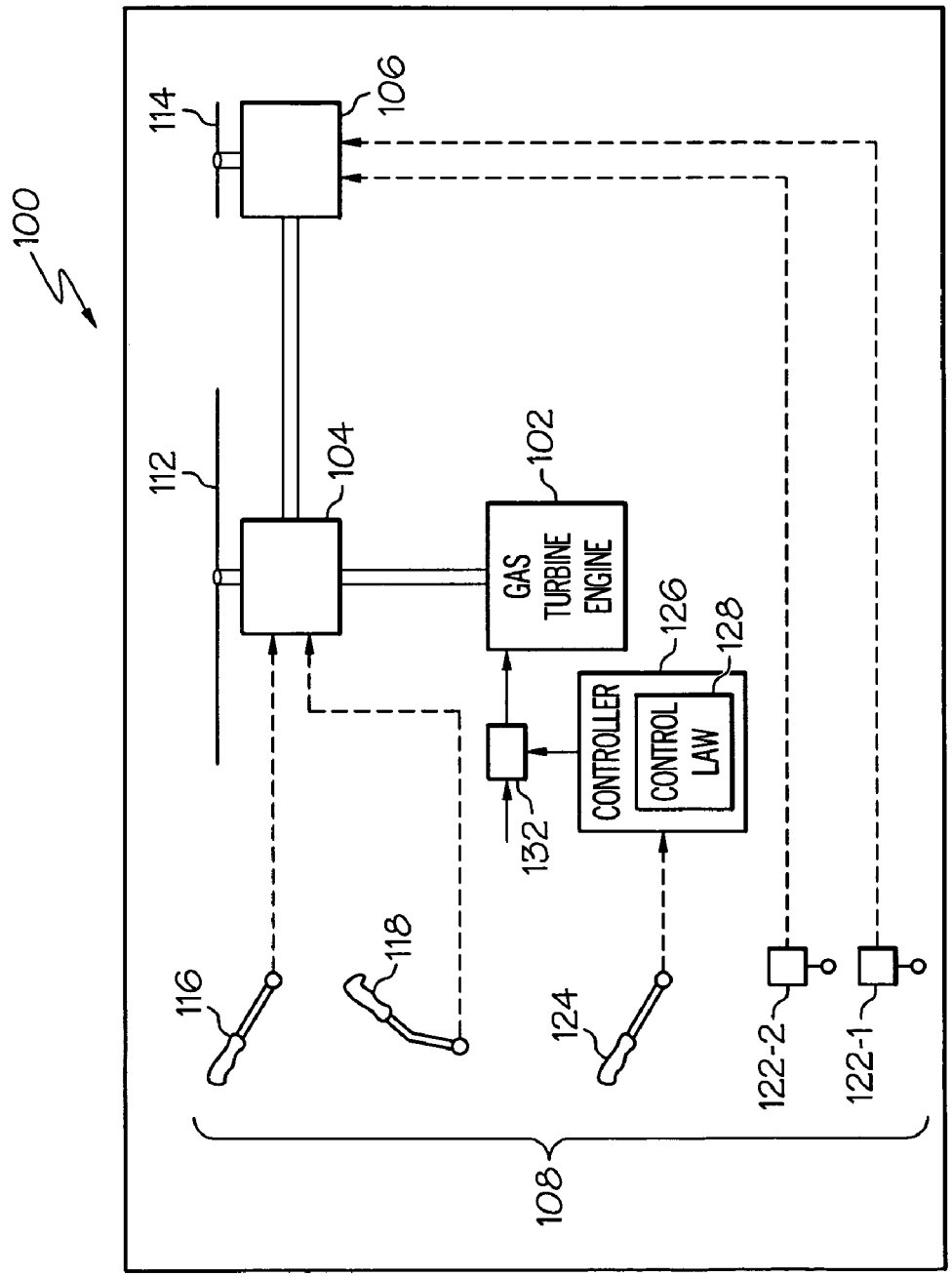
FIG. 1 depicts a functional schematic representation of an exemplary rotorwing aircraft.

Referring now to FIG. 1, a functional schematic representation of an exemplary rotorwing aircraft is depicted. The depicted rotorwing aircraft is a helicopter 100 that includes a gas turbine engine 102, a main rotor 104, a tail rotor 106, and a plurality flight control user interfaces 108. The gas turbine engine 102, when operating, generates torque, which is supplied, via suitable interconnecting gears and drive trains, to the main rotor 104 and the tail rotor 106.

The main rotor 104 includes a plurality of main rotor blades 112 and, when rotated by the gas turbine engine 102, generates vertical lift for the aircraft 100. The tail rotor 106 includes a plurality of rotor blades 114 and, when rotated by the gas turbine engine 102, generates a horizontal lift for the aircraft 100. The horizontal lift, as is generally known, is used to counteract the torque effect resulting from the rotation of main rotor 104, which causes the helicopter 100 to want to turn in a direction opposite to rotational direction of the main rotor 104.

The plurality of flight control user interfaces are include four separate devices—a collective 116, a cyclic 118, anti-torque pedals 122, and a throttle 124. The collective 116 is used to control the altitude of the helicopter by simultaneously changing the pitch angle of all the main rotor blades 112 independently of their position. Therefore, if a collective input is made, the pitch angle of all of the main rotor blades 112 change simultaneously and equally, resulting in the helicopter 100 either increasing or decreasing in altitude.

The cyclic 118 is used to control the attitude and airspeed of the helicopter 100 by controlling the pitch of the main rotor blades 112 cyclically. More specifically, the relative pitch (or feathering angle) of each of the main rotor blades 112 will vary as they rotate. The variation in relative pitch has the effect of varying the angle of attack of, and thus the lift generated by, each main rotor blade 112 as it rotates. Hence, if the cyclic 118 is moved forward or backward, the rotor disk (to which the main rotor blades 112 are coupled) tilts forward or backward, respectively, and thrust is produced in the forward direction or backward direction, respectively. Similarly, if the cyclic 118 is moved to the right or to the left, the rotor disk tilts to the right or left, respectively, and thrust is produced in the right direction or left direction, respectively.

The anti-torque pedals 122 (e.g., 122-1, 122-1) are used to control the yaw of the helicopter 100 (i.e., the direction in which it is pointed) by controlling the pitch of the tail rotor blades 114, thereby altering the amount of horizontal thrust produced by the tail rotor 106. More specifically, pressing the left pedal 122-1 or the right pedal 122-2 changes the pitch of the tail rotor blades 114, thereby increasing the horizontal thrust produced by the tail rotor 106 in the left or right direction, respectively. As a result, the helicopter 100 will yaw in the direction of the pressed pedal 122.

The throttle 124 is used to control the speed of the gas turbine engine 102. In the depicted embodiment the throttle 124 is shown as a separate power lever. It will be appreciated, however, that in some embodiments the throttle 124 may be implemented as a twist grip device that is disposed on another one of thus controls such as, for example, the collective 116. No matter how it is specifically configured, the throttle 124 supplies a suitable input signal to an engine controller 126. The engine controller 126 implements an engine control law 128 to control a suitable fuel flow control device 132, to control and regulate fuel flow to, and thus the speed of, the engine 102.

The aircraft 100 is preferably configured to implement, when needed or desired, a fixed collective takeoff (FCTO) without the undesirable reduction in engine speed, or the adverse maximum load impact, that presently known aircraft suffer. To do so, FCTO control logic is implemented that interacts with the engine control law 128. The FCTO control logic is configured to recognize the occurrence of a FCTO and implement suitable compensation. More specifically, the FCTO control logic is configured to determine when a FCTO is being conducted and, when a FCTO is being conducted, to at least selectively varying a control loop gain of the gas turbine engine controller. A simplified representation of an exemplary embodiment of a FCTO control logic 200 that implements this functionality is depicted in block diagram form in FIG. 2, and with reference thereto, will now be described.

Figure 2:
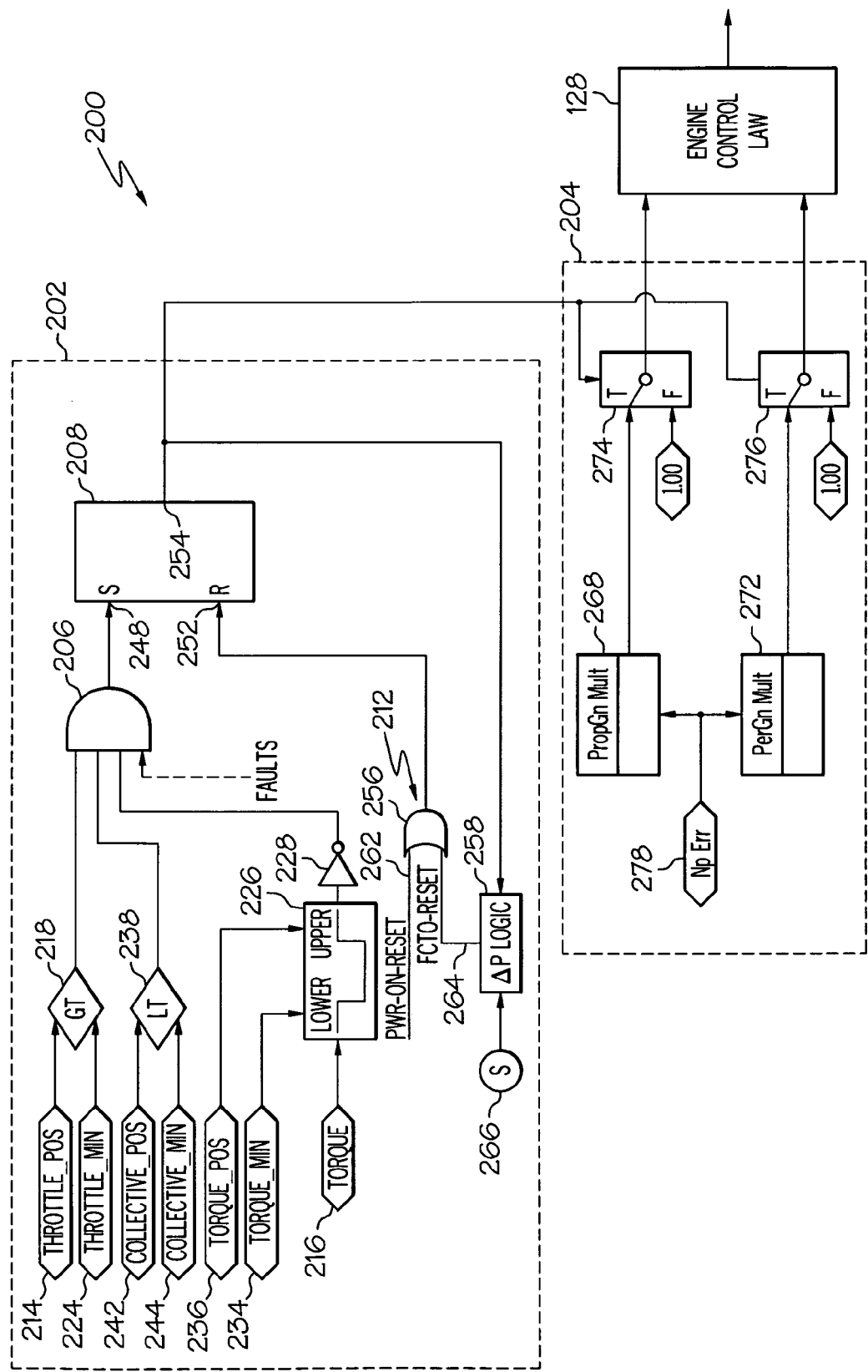
FIG. 2 depicts a functional schematic diagram of fixed collective takeoff control logic that may be implemented in the exemplary rotorwing aircraft of FIG. 1.

As FIG. 2 depicts, the FCTO control logic 200 interacts with the engine control law 128. As such, it will be appreciated that the FCTO control logic 200 could be implemented as part of the engine controller 126, if needed or desired. No matter where it is specifically implemented, the depicted control logic 200 includes FCTO determination logic 202 and gain multiplier logic 204. The FCTO determination logic 202 is operable to determine when a FCTO is being conducted and, when it determines that a FCTO is being conducted, to supply a FCTO enable signal. To implement this functionality, the FCTO determination logic 202, at least in the depicted embodiment, includes AND logic 206, S/R logic 208, and reset logic 212. A brief description of each of these logics will now be provided, beginning with the AND logic 206.

The AND logic 206 is that portion of the FCTO determination logic 202 that determines when a FCTO is being conducted. The AND logic 206 implements this function by receiving a plurality of signals representative of aircraft status and, when these signals indicate a particular state, supplying a set signal (e.g., logical "1") to the S/R latch 208. More specifically, the AND logic 206 is coupled to receive at least one signal representative of gas turbine engine state and a signal representative of a collective position. In the depicted embodiment the AND logic 206 receives a plurality of signals representative of gas turbine engine state, and these signals include a signal representative of engine throttle position 214 and a signal representative of the amount of torque being generated by the gas turbine engine 216.

The signal representative of engine throttle position 214 is the equivalent of a logical "1" state when the position of the engine throttle 124 is greater than a predetermined position. Thus, as FIG. 2 further depicts, the FCTO determination logic 202 may further include first comparator logic 218 that is configured to compare the engine throttle position signal 214 to a predetermined throttle position value 224 and supply an appropriate logic level signal. More specifically, the first comparator logic 218 is configured to supply a signal equivalent of a logical "1" if the engine throttle position signal 214 is greater than the predetermined value 224, and a signal equivalent of a logical "0" if the engine throttle position signal 214 is less than the predetermined value 224.

The signal representative of the amount of torque being generated by the gas turbine engine is the equivalent of a logical "1" state when the amount of generated torque is within a predetermined torque range. Thus, the depicted FCTO determination logic 202 may further include second comparator logic 226 and inverter logic 228 that together are configured to compare the signal representative of generated engine torque 216 to a predetermined minimum torque value 234 and a predetermined maximum torque value 236 and supply an appropriate logic level signal. More specifically, the second comparator logic 226 is configured to supply a signal equivalent of a logical "0" if the signal representative of generated engine torque 216 is between the predetermined minimum and maximum torque values 234, 236, and a signal equivalent of a logical "1" if the signal representative of generated engine torque 216 is either less than the predetermined minimum torque value 234 or greater than the predetermined maximum torque value 236. Because the signal output from the second comparator logic 226 is supplied to the inverter logic 228, it will be appreciated that the inverter logic 228 supplies a signal to the AND logic 206 that is equivalent of a logical "1" if the signal representative of generated engine torque 216 is between the predetermined minimum and maximum torque values 234, 236, and a signal equivalent of a logical "0" if the signal representative of generated engine torque 216 is either less than the predetermined minimum torque value 234 or greater than the predetermined maximum torque value 236.

The signal representative of collective position is the equivalent of a logical "1" state when the position of the collective 116 is less than a predetermined position. Thus, as FIG. 2 further depicts, the FCTO determination logic 202 may further include third comparator logic 238 that is configured to compare a collective position signal 242 to a predetermined collective position value 244 and supply an appropriate logic level signal. More specifically, the third comparator logic 238 is configured to supply a signal equivalent of a logical "1" if the collective position signal 242 is less than the predetermined collective position value 244, and a signal equivalent of a logical "0" if the collective position signal 242 is greater than the predetermined collective position value 244.

From the above description it may be readily appreciated that the FCTO determination logic 202 determines that a FCTO is being conducted when the engine throttle 124 is set above the predetermined throttle position value 224, the gas turbine engine 102 is generating an amount of torque between the predetermined minimum and maximum torque values 234, 236, and the collective 116 is set to a position less than the predetermined collective position value 244. In particular, when each of these conditions is met, the AND logic 206 will be supplied with signals equivalent of a logical "1", and will in turn supply the set signal to the S/R logic 208. If any of the inputs to the AND logic 206 are not set to a logical "1", then the AND logic 206 will supply a signal equivalent of a logical "0" to the S/R logic 208.

Before proceeding further, it is noted that the AND logic 206 may be configured to receive more or less than this number of logic-equivalent signals, and that the logic equivalent signals may vary. For example, as FIG. 2 depicts in phantom, the AND logic 206 may be configured to receive a logic-equivalent signal representative of whether one or more faults have been detected. The specific types and numbers of faults, and the manner in which the faults are detected is not needed to describe or enable the invention, and will therefore not be further discussed herein.

Turning now to the S/R logic 208, it is seen that this portion of the FCTO determination logic 202 is coupled to both the AND logic 206 and the reset logic 212. The S/R logic 208 includes a set input 248, a reset input 252, and an output 254. The S/R logic 208 is configured such that if the reset input 252 is supplied with the equivalent of a logical "0," then the output 254 of the S/R logic 208 will be the equivalent of a logical "1" if the set input 248 is supplied with the equivalent of a logical "1." Moreover, the output 254 of the S/R logic 208 will remain at a logical "1" until the reset input 252 is supplied with a logical "0." It will thus be appreciated that once the FCTO determination logic 202 determines that a FCTO is being conducted, it will continue to supply the FCTO enable signal (e.g., the equivalent of a logical "1") until the reset input 252 is supplied with a logical "0." This occurs when the reset logic 212, which will now be described, determines that the FCTO has been completed.

The reset logic 212, at least in the depicted embodiment, is implemented using OR logic 256 and differential pressure ($\Delta P$) logic 258. The OR logic 256 is coupled to receive a PWR-ON-RESET signal 262 and a FCTO-RESET signal 264, and supplies the equivalent of a logical "1" to the S/R logic reset input 252 if either or both of these signals are equivalent to a logical "1." The PWR-ON RESET signal 262 is a signal that is equivalent to a logical "1" when the FCTO control logic 200 is being initially powered on, and is then set to the equivalent of a logical "0." The FCTO-RESET signal 264 is normally set to the equivalent of a logical "0," and transitions to a logical "1" when the $\Delta P$ logic 258, once informed that a FCTO is being conducted, determines that the FCTO is complete. The manner in which the $\Delta P$ logic 258 makes this determination will now be described.

In general, the FCTO control logic 200 is configured to determine that a FCTO, once initiated, has been completed when the altitude of the aircraft 100 has increased a predetermined amount above the altitude the aircraft 100 was at when the FCTO was initiated. In the depicted embodiment, the FCTO control logic 200 makes this determination by determining the initial ambient pressure around the aircraft 100 when the FCTO was commenced, and then determining when the ambient pressure around the aircraft 100 has varied a predetermined pressure magnitude from the initial ambient pressure. To do so, the $\Delta P$ logic 258 is coupled to an ambient pressure sensor 266 and to the output 254 of the S/R logic 208. The ambient pressure sensor 266 is operable to sense ambient pressure around the aircraft 100 and supply a signal representative thereof to the $\Delta P$ logic 258. The $\Delta P$ logic 258 is configured, upon the signal supplied from the S/R logic 208 being set to the equivalent of a logical "1" (e.g., a FCTO being commenced), to store the sensed ambient pressure as the initial ambient pressure and begin comparing subsequently sensed pressures to the initial ambient pressure. Thereafter, when the sensed ambient pressure has decreased a predetermined pressure magnitude from the initial ambient pressure value, indicating that the aircraft 100 has increased in altitude the predetermined amount, the $\Delta P$ logic 258 supplies the equivalent of a logical "1" to the OR logic 256. As was noted previously, whenever the OR logic 256 has the equivalent of a logical "1" on one or both of its inputs it supplies the equivalent of a logical "1" to the S/R logic reset input 254. This in turn causes the S/R logic 208 to no longer supply the FCTO enable signal (e.g., a logical "1") to the gain multiplier logic 204.

The gain multiplier logic 204 is coupled to receive the FCTO enable signal and is responsive to this signal to supply variable control loop gain multipliers. Although the gain multiplier logic 204 could be variously configured to implement this functionality, in the depicted embodiment the gain multiplier logic 204 includes proportional multiplier map logic 268, derivative multiplier map logic 272, proportional multiplier enable logic 274, and derivative multiplier enable logic 276. It will be appreciated that the gain multiplier logic 204 could be implemented with more or less than this number of multiplier map logic depending, for example, on the specific implementation of the engine control law 128. In the depicted embodiment, the engine control law implements proportional-plus-derivative (PD) control, thus proportional multiplier and derivative multiplier map logic 268, 272 are both included.

No matter the specific number and type of multiplier map logic included, it is seen that each is coupled to receive a signal representative of speed error (NpErr) 278. The speed error, as may be appreciated, is the difference between the commanded speed of the engine 102 and the actual (e.g., sensed) speed of the engine 102. The proportional multiplier map logic 268 and the derivative multiplier map logic 272 are both responsive to the speed error signal 278 to supply gain multipliers to the proportional multiplier enable logic 274 and the derivative multiplier enable logic 276, respectively.

The proportional multiplier enable logic 274 and the derivative multiplier enable logic 276 are each responsive to the FCTO enable signal to selectively couple either a one (e.g., 1.00) or the output of its respective multiplier map logic 268, 272 to the engine control law 128. Though not depicted in FIG. 2, it will be appreciated that the values supplied from the enable logics 274, 276 to the engine control law are multiplied, within the engine control law 128, by the normally implemented control gains. Thus, when a FCTO is not being conducted, the FCTO enable signal will not be set (e.g., equivalent to a logical "0"), and the enable logics 274, 276 will supply 1.00 values to the engine control law 128. As a result, the normally implemented control gains (which are multiplied by the 1.00 values) will be implemented. Conversely, when a FCTO is being conducted, the FCTO enable signal will be set (e.g., equivalent to a logical "1"), and the enable logics 274, 276 will supply values output from the multiplier map logics 268, 272 to the engine control law 128. As a result, the normally implemented control gains are multiplied by these values, which will allow the engine speed to increase, when needed, during a FCTO. It is noted again that this is merely exemplary of one manner of implementing this functionality.

Figure 3:
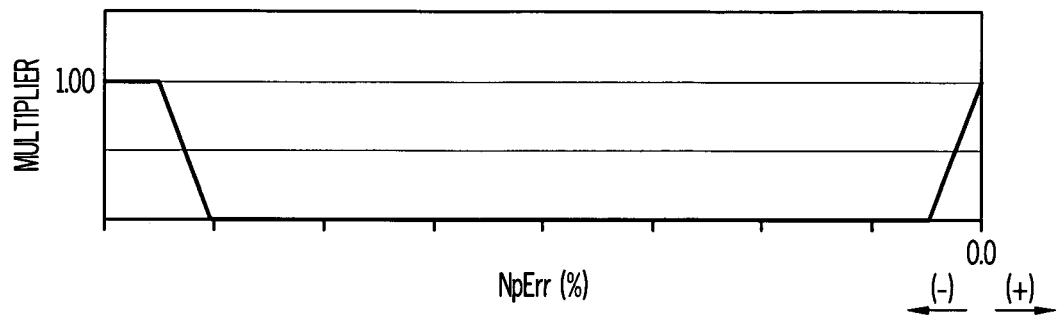
FIG. 3 is a graph that depicts an exemplary manner in which proportional gain multipliers that are supplied by the control logic of FIG. 2 may vary.
Figure 4:
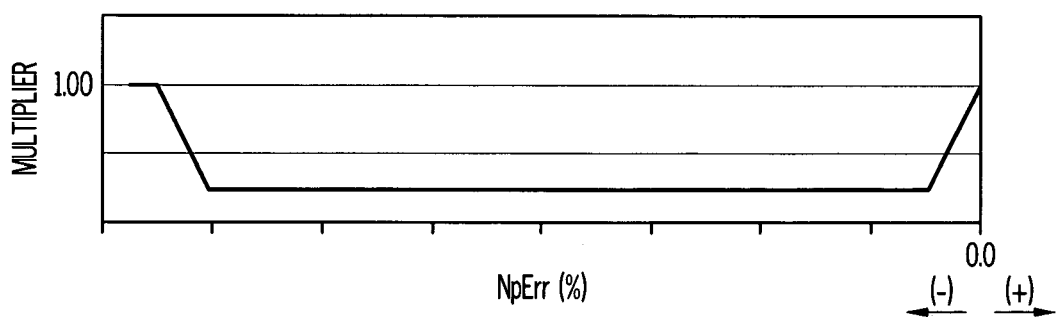
FIG. 4 is a graph that depicts an exemplary manner in which derivative gain multipliers that are supplied by the control logic of FIG. 2 may vary.

It will be appreciated that the proportional multiplier map logic 268 and the derivative multiplier map logic 272 may be configured to supply proportional and derivative gain multipliers, respectively, that vary with engine speed error in accordance with any one of numerous manners. One particular manner in which the proportional gain multipliers vary with engine speed error is depicted in graphic form and in tabular form in FIGS. 3 and 4, respectively. Similarly, one particular manner in which the derivative gain multipliers vary with engine speed error is depicted in graphic form and in tabular form in FIGS. 5 and 6, respectively. Again, it will be appreciated that the manner in which these multipliers vary with engine speed error is merely exemplary of one particular implementation.

The system and method described herein provide for the determination of when a FCTO of a rotorwing aircraft is being conducted and, when it is determined that a FCTO is being conducted, the control loop gains of the gas turbine engine controller are at least selectively varied. In this manner, an undesirable reduction in engine speed does not occur during the FCTO, and the maximum load of the aircraft is not adversely impacted.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling a gas turbine engine controller in a rotorwing aircraft that includes a gas turbine engine, an engine throttle, and a collective, the method comprising the steps of:
   determining when a fixed collective takeoff (FCTO) of the rotorwing aircraft is being conducted; and
   when the FCTO is being conducted, at least selectively varying a control loop gain of the gas turbine engine controller,
   wherein the step of determining when the FCTO is being conducted comprises:
      determining that the collective is positioned at a collective pitch that is less than a predetermined collective pitch; and
      determining that the engine throttle is positioned at a throttle position that is less than a predetermined throttle position.

2. The method of claim 1, wherein the step of determining when the FCTO is being conducted further comprises determining that the gas turbine engine is generating an amount of torque that is within a predetermined torque range.

3. The method of claim 1, further comprising:
   determining when the FCTO is complete; and
   when the FCTO is complete, no longer at least selectively varying the control loop gain of the gas turbine engine controller.

4. The method of claim 3, wherein the step of determining when the FCTO is complete comprises:
   determining when the rotorwing aircraft has increased in altitude a predetermined amount.

5. The method of claim 4, wherein the step of determining when the rotorwing aircraft has increased in altitude a predetermined amount comprises:
   determining an initial ambient pressure, the initial ambient pressure being ambient pressure around the rotorwing aircraft when the FCTO was commenced; and
   determining when the ambient pressure around the rotorwing aircraft has varied a predetermined pressure magnitude from the initial ambient pressure.

6. The method of claim 1, wherein the gas turbine engine controller is operable to control the speed of a gas turbine engine, and wherein the method further comprises:
   determining a speed error in the gas turbine engine controller, the speed error based on a difference between actual gas turbine engine speed and commanded gas turbine engine speed; and
   at least selectively varying the control loop gain of the gas turbine engine controller based on the determined speed error.

7. The method of claim 1, wherein the gas turbine engine controller includes a proportional gain and a derivative gain, and wherein the step of at least selectively varying a control loop gain of the gas turbine engine controller comprises:
   at least selectively varying the proportional gain; and
   at least selectively varying the derivative gain.

8. A gas turbine engine control system for a rotorwing aircraft, comprising:
   fixed collective takeoff (FCTO) determination logic, the FCTO determination logic operable to determine when a FCTO is being conducted and, when a FCTO is being conducted, supply a FCTO enable signal;
   a gas turbine engine controller operable to control the speed of a gas turbine engine, the gas turbine engine controller coupled to the FCTO determination logic and operable to supply a speed error signal representative of a difference between actual gas turbine engine speed and commanded gas turbine engine speed; and
   gain multiplier logic coupled to receive the speed error signal and the FCTO enable signal and operable, upon receipt thereof, to supply variable control loop gain multipliers.

9. The system of claim 8, wherein:
   the FCTO determination logic is adapted to receive one or more signals representative of gas turbine engine state and a signal representative of a collective position; and
   the FCTO determination logic is operable, upon receipt of the one or more signals representative of gas turbine engine state and the signal representative of collective position, to determine when the FCTO is being conducted.

10. The system of claim 9, wherein the FCTO determination logic is operable:
   upon receipt of the one or more signals representative of gas turbine engine state, to determine that a gas turbine engine is in a predetermined state; and
   upon receipt of the signal representative of collective position, to determine that a collective is positioned at a collective pitch that is less than a predetermined collective pitch.

11. The system of claim 10, wherein:
   the one or more signals representative of gas turbine engine state include a signal representative of an amount of torque being generated by a gas turbine engine; and
   the FCTO determination logic is operable to determine that the amount of torque being generated is within a predetermined torque range.

12. The system of claim 11, wherein:
   the one or more signals representative of gas turbine engine state further include a signal representative of engine throttle position; and
   the FCTO determination logic is operable to determine that the engine throttle is positioned at a throttle position that is less than a predetermined throttle position.

13. The system of claim 8, wherein the FCTO determination logic is further operable to:
   determine when the FCTO is complete; and
   no longer supply the FCTO enable signal when the FCTO is determined to be complete.

14. The system of claim 13, wherein:
   the FCTO determination logic is adapted to receive a signal representative of rotorwing aircraft altitude; and
   the FCTO determination logic is operable to determine when the FCTO is complete based on the signal representative of rotorwing aircraft altitude.

15. The system of claim 14, further comprising:
   an ambient pressure sensor operable to sense ambient pressure and supply an ambient pressure signal, the ambient pressure signal being the signal representative of rotorwing aircraft altitude.

16. The system of claim 15, wherein:
   the FCTO determination logic is further operable, upon initially determining that a FCTO is being conducted, to store an initial ambient pressure value, the initial ambient pressure being the sensed ambient pressure when the FCTO was commenced; and
   the FCTO determination logic determines that the FCTO is complete when the sensed ambient pressure has varied a predetermined pressure magnitude from the initial ambient pressure value.

17. The system of claim 8, wherein the gain multiplier logic is further operable to selectively vary the control loop gain multipliers supplied thereby based on the speed error signal.

18. The system of claim 8, wherein the control loop gain multipliers include proportional gain multipliers and derivative gain multipliers, and wherein the system further comprises:
   a gas turbine engine controller that implements both a proportional gain and a derivative gain, the gas turbine engine controller coupled to receive the proportional gain multipliers and the derivative gain multipliers and, upon receipt thereof, to at least selectively vary the proportional gain and the derivative gain, respectively.

19. A method of controlling a gas turbine engine controller in a rotorwing aircraft, the gas turbine engine controller including a proportional gain and a derivative gain, the method comprising the steps of:
   determining when a fixed collective takeoff (FCTO) of the rotorwing aircraft is being conducted; and
   when the FCTO is being conducted, at least selectively varying a control loop gain of the gas turbine engine controller by at least selectively varying the proportional gain and at least selectively varying the derivative gain.

* * * * *